United States Patent [19]
Holtzapple et al.

[11] Patent Number: 5,171,592
[45] Date of Patent: Dec. 15, 1992

[54] BIOMASS REFINING PROCESS

[75] Inventors: Mark Holtzapple, College Station; Richard R. Davison, Bryan; Earnest D. Stuart, Brenham, all of Tex.

[73] Assignee: Afex Corporation, Brenham, Tex.

[21] Appl. No.: 810,818

[22] Filed: Dec. 19, 1991

Related U.S. Application Data

[63] Continuation of Ser. No. 713,579, Jun. 11, 1991, abandoned, which is a continuation of Ser. No. 487,531, Mar. 2, 1990, abandoned.

[51] Int. Cl.$^5$ ............................................. A23K 1/00
[52] U.S. Cl. .................................. 426/69; 426/635; 426/807
[58] Field of Search ................. 426/447, 449, 69, 635, 426/636, 807

[56] References Cited

U.S. PATENT DOCUMENTS
4,644,060 2/1987 Chou .................................. 426/69

Primary Examiner—George Yeung
Attorney, Agent, or Firm—Arnold, White & Durkee

[57] ABSTRACT

An improved biomass refining process is disclosed which is considerably more efficient and cost effective than conventional refining processes. The apparatus and method of the present invention employs superheated steam to dry the solid components and uses the excess steam generated in the drying step to concentrate the liquid components, solidify soluble components and expel noncondensible components. The present invention further employs improved Ammonia Freeze Explosion technology to further enhance the food value of biomass and the solid fiber components separated from the biomass during refining.

21 Claims, 11 Drawing Sheets

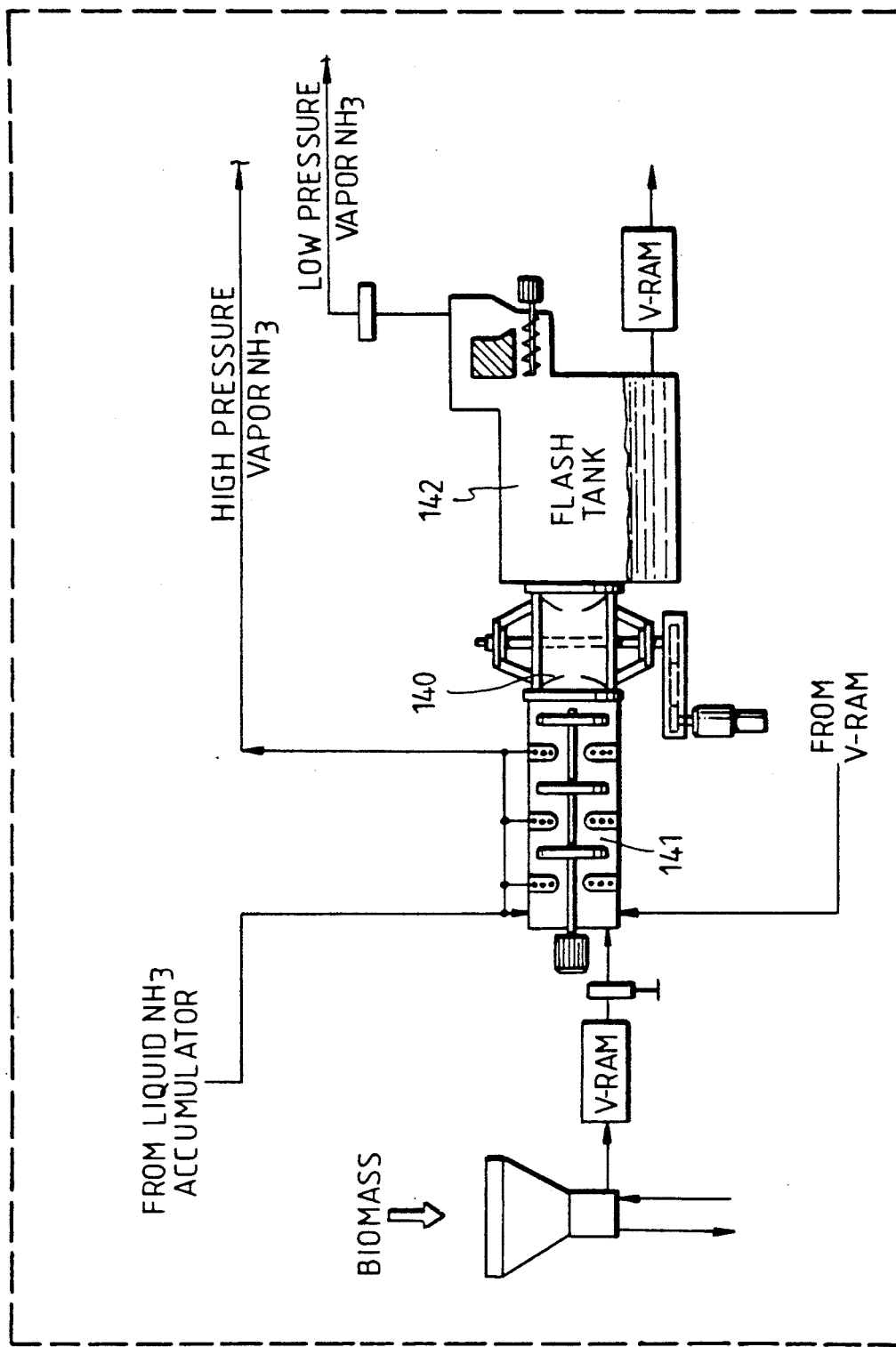

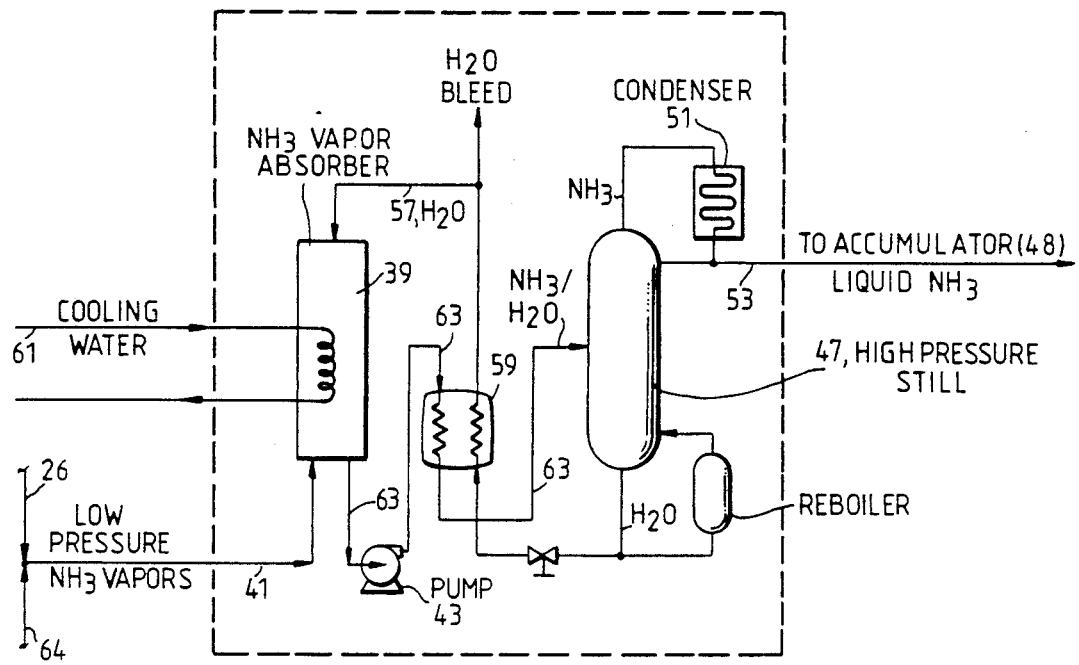
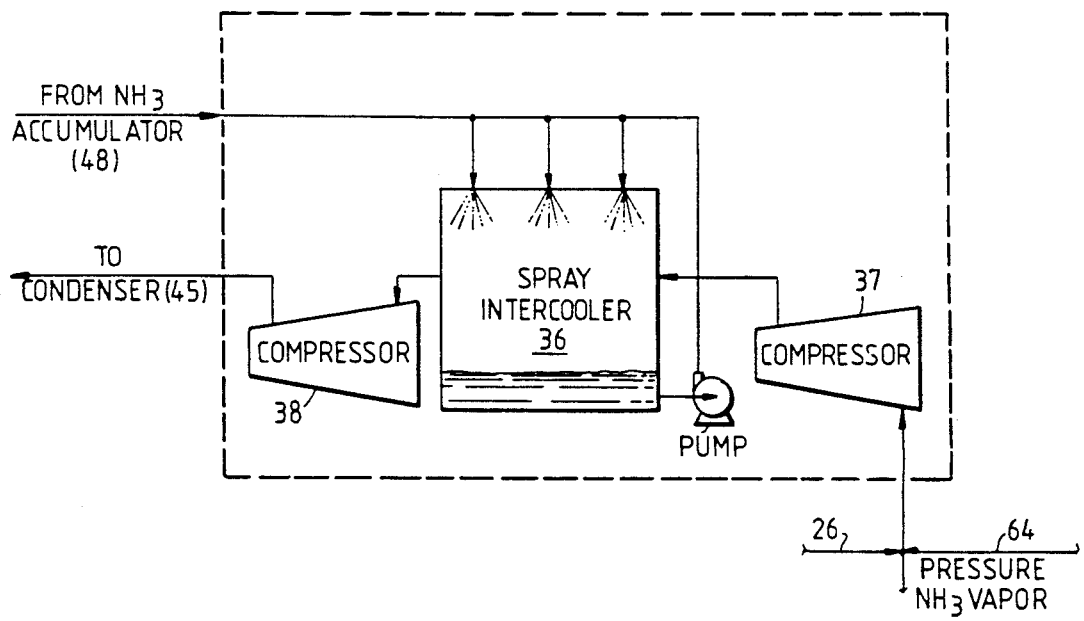

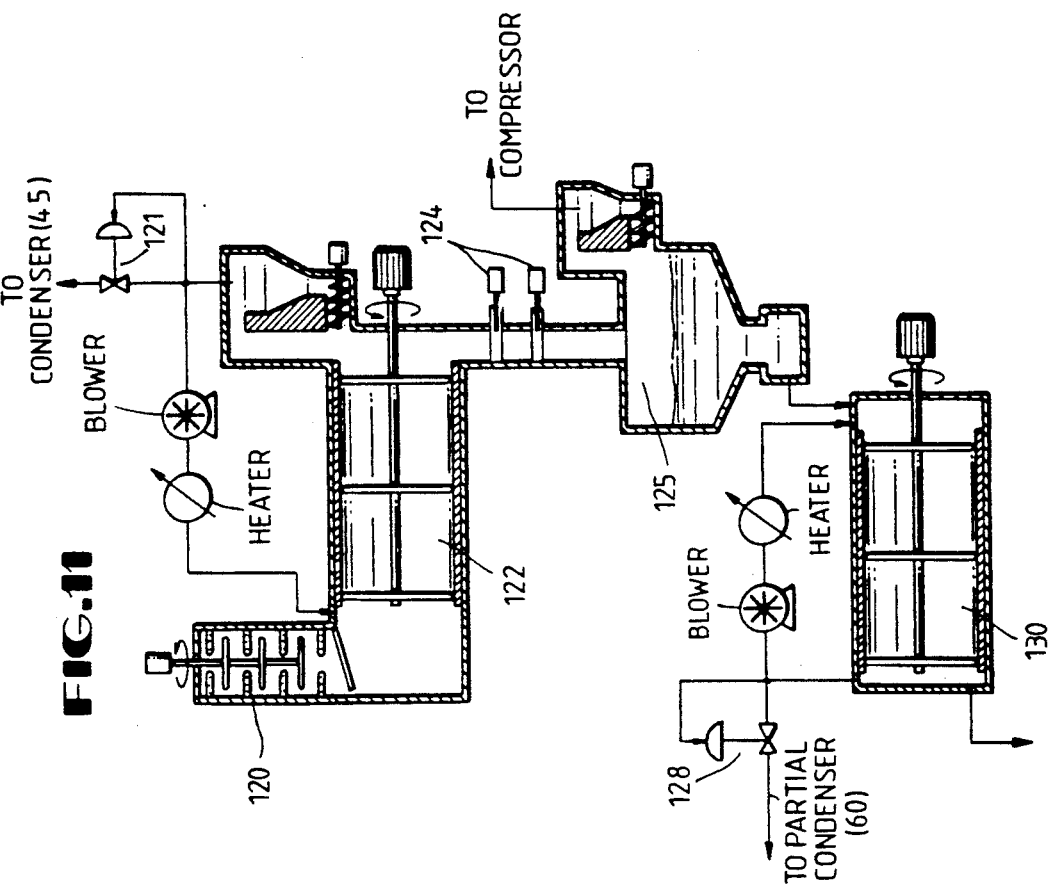
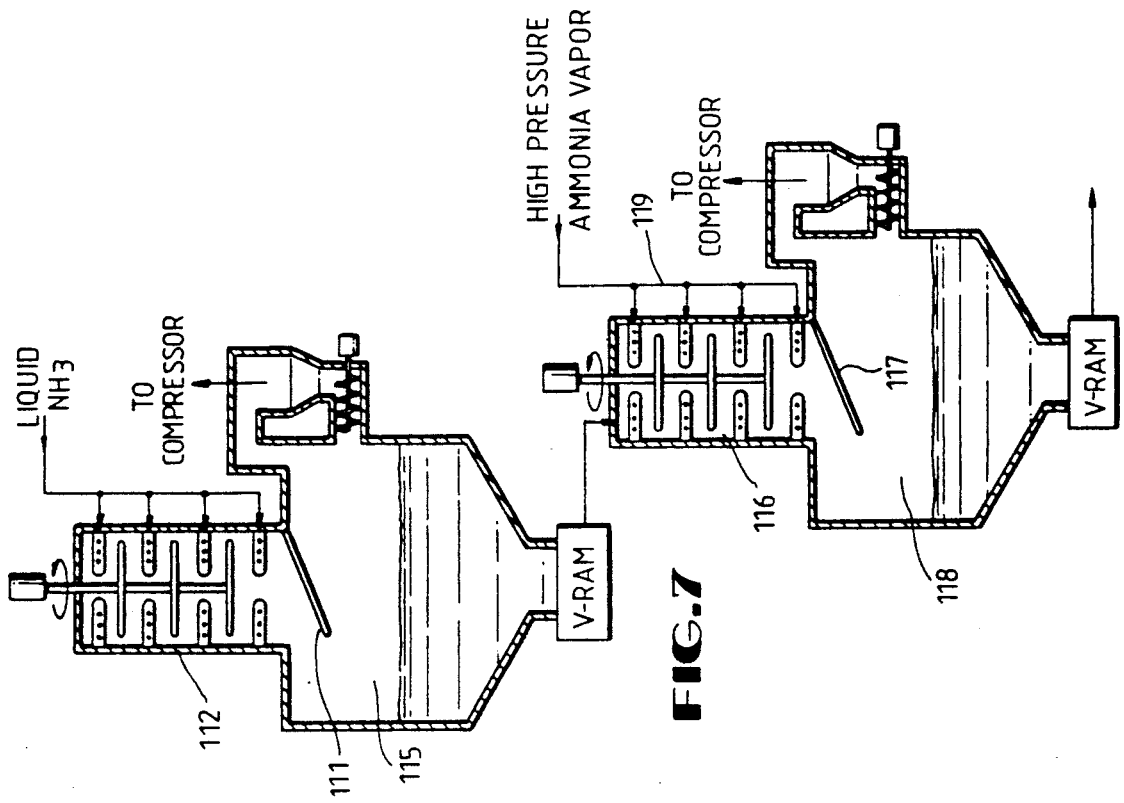

BIOMASS REFINING PROCESS

This is a continuation of copending U.S. Pat. application Ser. No. 07/713,579 filed Jun. 11, 1991, now abandoned, which is a continuation of U.S. Pat. application Ser. No. 07/487,531 filed Mar. 2, 1990, now abandoned.

BACKGROUND OF THE INVENTION

1. Field of the Invention

The present invention relates to improvements in methods and apparatus for refining biomass to increase its digestibility and chemical reactivity. The invention further relates to improvements in the recovery of valuable components of biomass for use as feedstuffs or as fermentation substrates in ethanol production. The invention is especially concerned with the use of superheated vapors to dry or heat a biomass or biomass component and to recycle resulting excess vapors for used elsewhere in the treatment of biomass or biomass components.

2. Description of Related Art

Many techniques have been developed over the years to refine biomass. For example, dry-grinding to fine particles sizes has been explored extensively. Under extreme conditions of ultra-fine dry-grinding, grinding has been shown to increase biomass reactivity. However, fine dry-grinding is generally inefficient and uneconomical. Other techniques includes, among others, processes for protein extraction and processes for swelling cellulosic fiber. Protein extraction processes are primarily concerned with the recovery of protein and remaining soluble components, whereas swelling processes are used to increase the digestibility and chemical reactivity of insoluble fiber components of biomass.

For protein extraction, green, leafy biomass constitutes the largest source of protein, but leafy plants also contain high percentages of fibrous structural materials such as cellulose. Thus, leafy biomass has great potential as a protein source if the protein can be separated from the fiber components and recovered in a suitable form. A common feature of conventional protein extraction processes is that biomass is crushed and the juice is squeezed out of the fiber. The juice is used per se or protein is recovered from the juice by heating or chemical precipitation. The protein can then be removed simply by filtration. Alternatively, the protein can be removed directly by ultrafiltration. Amino acids and free sugars in the remaining juice may be concentrated and sold as an amino-acid-rich syrup or put back with the fiber. The fiber may then be used as a ruminant animal feed or as a fermentation feedstock.

The types of biomass used for protein extraction often include alfalfa, sorghum, clover, field beans, mustard kale, fodder radish, banana leaves, aquatic plants, grasses and the like. Requirements for crops suitable for protein extraction are as follows: rapid growth with high yields of protein during the growing season; absence of mucilaginous sap which makes it difficult to separate juice from the fiber, or acidic or high tannin saps which prevent extraction of protein into the juice because of precipitation in the pulp; and absence of toxic materials such as glycosides that could be carried into the final product.

Leaf protein processing is one of the most developed biomass refining processes since it has been operated commercially. For example, following the Pro-Xan process, green, leafy biomass such as fresh alfalfa is ground in a hammer mill and then placed in an oil seed screw press to separate the juice from the fiber. The screw press is typically able to separate about 42% by weight solids from the raw biomass. Anhydrous ammonia is added to the juice to adjust the pH to about 8.5 which makes the protein curds more filterable. Steam is injected into the juice to raise the temperature to about 85° C. The deproteinated liquid is used to wash the press cake which recovers more protein. The total recovery of protein is from about 30 to 60%. Drying of the protein curds and fiber is accomplished in a hot air dryer. The deproteinated liquid is evaporated to make a concentrate of amino acids and free sugars. This is placed back on the fiber which is sold as animal feed.

As another example, the Pro-Xan II process allows the soluble proteins to be separated into two groups. First, the "chloroplastic proteins," associated with green pigments, are coagulated by heating to about b 60° C. This fraction is separated out and may be used as an animal feed. Then the remaining "cytoplasmic proteins" are removed by heat coagulation at about 80° C. These proteins are nearly white and are suitable for human consumption.

However, expanded commercial development of leaf protein processing has been limited by high capital and operating costs as compared with the low yields of protein generally obtained. Some of the high operational costs may be attributed to the drying step of the protein extraction processes which generally utilizes hot air. Air driers use considerable energy to dry the protein product and to concentrate the remaining juice. Also, use of an air drier wastes energy as nearly ½ of the heat is lost in exiting hot air. Moreover, air drying causes oxidation damage to the protein and thus contributes to the overall low yields of protein product. Air drying below 80° C. minimizes damage to proteins but results in a hard, dark colored product which may be unsuitable for commercial purposes. Thus, drying conditions are important in determining the quality of the protein product.

Certain types of biomass have little or no value for protein extraction and are often considered waste materials. These cellulosic wastes include the biomass of aspen chips, sawmill and logging residues, wheat straw, wheat chaff, barley straw, rice straw, corn stover, sugarcane bagasse, kochia stems, and the like. However, the value of these materials may be increased by utilizing various swelling techniques known in the art.

For example, a high degree of biomass disruption can be achieved if lignocellulosic fiber structures are subjected to various forces, including forces such as friction, shearing and rapid expansion. Ground-up or disrupted materials can be treated with cellulose decrystallizing chemicals such as ammonia followed by separating the biomass from the liquid ammonia. This results in a biomass with increased chemical and biological reactivity. An effective method of achieving disruptive expansion employs rapid decompression within a vessel containing ammonia-soaked biomass which causes the liquid ammonia to gasify and to violently expand. The pressure drop instantly creates gas bubbles inside the biomass which expand and disrupt the fibrous material. The chemical changes and increased surface area from the explosion provides material with increased biological reactivity. For instance, sugar polymers such as cellulose and xylan have greatly increased rates and final yields of monomeric sugars by enzymatic hydrolysis.

One such swelling and decompression technique known as the Ammonia Freeze Explosion, and more recently as the Ammonia Fiber Explosion or "AFEX" process, a cellulosic-fiber containing biomass is contacted with liquid ammonia in a pressure vessel. The contact is maintained for a sufficient time to enable the ammonia to swell (i.e., decrystallize) the cellulose fibers. The pressure is then rapidly reduced which allows the ammonia to flash or boil and explode the cellulose fiber structure. (See U.S. Pat. No. 4,600,590 which is incorporated by reference herein.) Other volatile cellulose-swelling agents may be utilized in the AFEX process. These include monomethylamine, monoethylamine, other primary and secondary amines, liquid nitrogen dioxide, liquid sulfur dioxide, and the like.

The AFEX process may also be conveniently employed to improve the economics of leaf protein processing by increasing the food value and chemical reactivity of the press cake which remains after the biomass is crushed and the juice is squeezed out of the fiber.

However, in the AFEX process, the exploded material may contain as much as a pound of swelling agent per pound of dry biomass. Before the exploded fiber can be used, this swelling agent must be removed. Also, to control the cost, the swelling agent must be recovered. Various methods have been proposed for removal and recovery of swelling agents such as liquid ammonia. One method involves washing the exploded material with water, distilling the ammonia from the water and drying the fiber. In a second method, the exploded material is sent to an air drier and the air is sent to an absorber where the ammonia is recovered from the water by distillation. A third method involves heating the walls of the ammonia recovery vessel until the ammonia is driven off at low-pressure. The first two methods require large amounts of energy for the evaporation and distillation of ammonia. The third method is undesirable due to high compression costs and poor heat transfer.

SUMMARY OF THE INVENTION

The present invention is directed to an improved biomass refining process which addresses the disadvantages inherent in prior methods and can be used to refine any biopolymer-containing material. Thus, in addition to protein-containing and cellulosic materials, materials containing other biological polymers such as starch or chitin may be rendered more reactive by the refining process of the present invention. The methods and apparatus of the present invention may be used for leaf protein extraction, swelling and increasing the reactivity of cellulose or other biological polymer containing biomass, or combinations of these techniques.

The present invention in a general aspect comprises an improved system for treating biomass wherein the biomass contains a liquid that is heated with superheated vapors of the liquid to remove the liquid from the biomass. Thus, if the liquid in the biomass is water, the biomass is contacted with superheated steam, not only to remove water from the biomass but also to provide steam for use in heating the biomass or components of the biomass in other phases of the process. On the other hand, if the liquid in the biomass is a liquified swelling agent such as ammonia, the biomass is contacted with superheated vapors of the swelling agent to vaporize the swelling agent and strip it from the biomass. The resulting swelling agent vapors may then be liquified and recycled to the swelling process. In either case, the vapors of steam or swelling agent generated by the superheated steam or swelling agent may be considered excess vapors to the extent they cause the operating pressure of the system to be exceeded.

One principal improvement according to the present invention involves the use of superheated steam ("SHS") having a temperature of from about 110° C. to about 260° C. as the drying medium. The SHS drying process is considerably more efficient than air drying and produces steam for use in other process operations such as juice concentration, solidification of soluble proteins, distillation, removal of the biomass swelling agent, and other heating operations described below. As noted above, the evaporated water vapors from the wet biomass (or component thereof) produced during the SHS drying process may be considered as "excess" vapors to the extent that such vapors cause the operating pressure of the SHS drier to be exceeded. Therefore, when the phrase "excess steam" is used during the following description, it will be understood that the phrase refers to the evaporated water vapors generated during the SHS drying process, which vapors raise the system pressure. The excess steam may then exit the SHS drier through a pressure control means. In this respect, the present invention relates to the recognition that this excess steam, (i.e. steam produced by vaporizing the liquid removed from the biomass or component), has enormous amounts of available and recoverable thermal energy.

According to one embodiment of the invention, superheated steam or excess steam generated by the steps described above may be used to deaerate a biomass or biomass component. This is beneficial prior to drying or exploding the biomass or biomass component. It has been discovered that the deaeration of the biomass, among other things, helps to reduce oxidation damages otherwise occasioned by the presence of air in the process and reduces the necessity of later air removal from downstream processing. Also, when deaeration is effected prior to drying, it preheats the biomass. Thus, this aspect of the invention is especially beneficial in processes in which a biomass or a protein curd component of a biomass is contacted in an SHS drier to dry the biomass or the curd. Prior to the drying step, the biomass or curd is contacted directly with the steam to strip or expel air and other noncondensibles from the biomass or curd. In one embodiment, excess steam from the drying process is introduced into the biomass or solid form component countercurrent to the flow of the biomass in the process. The dried, deaerated biomass or curd may then be further processed as desired. In the case of a dried, deaerated biomass, for example, this biomass may be subjected to a process such as the AFEX process which expands the biomass fiber by contact with a volatile swelling agent such as liquid ammonia.

The term "AFEX" is used herein to generally designate processes in which a biomass or fiber component thereof is expanded with a volatile swelling agent such as liquid ammonia, monomethylamine, monoethylamine, other primary and secondary amines, liquid nitrogen dioxide, liquid sulfur dioxide, mixtures thereof, and the like. Therefore, when liquid ammonia is referred to during the following description of the present invention, it will be understood to be merely illustrative and not to be construed in a limiting sense.

According to another aspect of the present invention, a preheated biomass is forced into an SHS drier where it is dried by contact with superheated steam at a temperature of from about 110° C. to about 260° C. The SHS may be considerably hotter than the biomass since the biomass temperature will be determined by the system pressure. (Usually, the biomass is at a temperature of about 100° C. to about 180° C). The evaporated water will raise the system pressure, and a pressure control will allow excess steam to exit the drier for other process uses. If protein has been precipitated from juice previously squeezed from the biomass, it too must be dried, and this is preferably done in the same manner with the excess steam similarly used in other processing.

According to yet another aspect of the present invention, removal of a swelling agent from AFEX-treated material is achieved by contact with superheated vapors of the particular swelling agent employed. Biomass contact with superheated vapors is similar to that of an air drier. When liquid ammonia is used as the swelling agent, superheated ammonia ("SHA") vapors having a temperature of from about 40° C. to 200° C. are employed in the process. The evaporating ammonia increases the flow of the SHA vapors. As the ammonia is evaporated, the pressure in the system tends to increase because of the increase in the quantity of vapor. A pressure controller withdraws this excess ammonia for recovery. The remaining ammonia is reheated and circulated to the drier thus keeping the quantity of SHA vapor approximately constant.

In a preferred embodiment of the invention, biomass or a fiber component of the biomass is dried in an SHS drier prior to AFEX processing. This has several synergistic effects and advantages over previous AFEX techniques. The drying not only adjusts the water content but it also prehydrolyzes, preheats and softens the biomass in preparation for AFEX treatment. Whether the material is brought in from the field or has been squeezed, it still likely will contain more water than optimum. By pre-AFEX drying, the moisture content can be optimized and reactivity in the AFEX process improved. For example, a lower moisture content will facilitate recovery of the swelling agent at a high-pressure thereby avoiding the necessity of additional low-pressure recovery steps. Secondly, as discussed above, excess steam is introduced into the material prior to entry into the SHS drier to expel excess air. When the hot material from the SHS dryer goes directly to AFEX, the added heat accelerates decrystallization of the fiber which results in reduced ammonia soak time. Finally, when liquid ammonia contacts the hot material, some of the ammonia evaporates cooling the material to the desired soak temperature.

In general, the desired soak temperature is dependent on the type of biomass. For example, a protein containing biomass, such as Coastal bermudagrass, would have a desired soak temperature of about 40° C. to about 80° C., whereas higher soak temperatures are preferably employed for a biomass containing high quantities of lignin. In any case, the ammonia vapors produced by cooling the hot biomass may be withdrawn at elevated pressure to minimize recompression or preferably at a pressure such that condensation of the ammonia is possible without compression such as cooling with air or water. This results in a substantial energy savings and a savings in compressor investment.

An additional advantage of combining SHS and SHA driers is that excess steam produced in the SHS driers should furnish all the heat needed to heat the ammonia for the SHA driers. Hence, three very synergistic things are accomplished. First, the biomass is dried to the desired level with only a small increase, if any, on plant heat requirements. Secondly, the water levels in the biomass or fiber component are controlled to either improve AFEX efficiency and/or to improve ammonia removal by minimizing water content. Thirdly, a combination of steam treatment and AFEX will tend to be more effective than the individual treatments alone due to synergistic effects. For example, the steam treatment will tend to generate some mild organic acids and prehydrolyze biomass components making the biomass more susceptible to decrystallization and explosion by an AFEX process. Also, the product is substantially sterilized by these two processes which is desirable if sent to fermentation.

The SHA driers may be operated at high-pressure (superatmospheric), low-pressure (relative to the high-pressure drier), or in combination. When the process is carried out at an elevated pressure, there is a savings in ammonia vapor compression. It is preferred that the elevated pressure be sufficiently high, e.g., 200 psig, such that the evaporated ammonia may be withdrawn and condensed without compression using ambient cooling such as water or air. Thus, the drier pressure will be set by the temperature of the cooling media. This can represent a considerable energy savings and a savings in compressor investment.

Advantageously, a high-pressure SHA drier may be followed by a low-pressure SHA drier. The low-pressure drier may be at superatmospheric, atmospheric, or below, but is usually significantly lower in pressure relative to the high-pressure drier. As noted above, the pressure in the high-pressure drier is sufficiently high such that the ammonia can be condensed by ambient media such as air or water. The pressure in the low-pressure drier, however, should be reduced sufficiently relative to the high-pressure drier to take out residual water. At high-pressure, residual water may tend to hold some ammonia in the exploded material. This ammonia may be recovered by lowering the pressure. Therefore, utilization of both high- and low-pressure SHA driers may help to maximize the recovery and removal of ammonia from the exploded material while minimizing recompression costs.

Depending on the water content of the exploded biomass or fiber component thereof, and the operating temperatures of the low-pressure SHA drier, it may be desirable to remove water from the SHA vapors. This may be done by cooling all or part of the ammonia vapors as they exit the drier in a partial condenser in which water preferentially condenses. This ammonia-water stream is sent to distillation for ammonia recovery. If an SHS drier is employed elsewhere in the process, the required heat may be supplied by excess steam. The partially dehydrated ammonia vapor may then be recompressed (if necessary), condensed and recycled for reuse in the AFEX process.

There are several advantages to this improved biomass refining procedure: (1) The presence of other substances, such as air or water, may be controlled; (2) Degradation of the product from air oxidation may be reduced; (3) The food value of biomass fiber may be greatly improved by employing the AFEX process; (4) When SHA circulation drying is done at higher pressure, the compressor work and compressor cost may be greatly reduced; (5) Excess steam from SHS driers may be utilized for the SHA driers, distillation, juice concentration, and other process steps, thus greatly contributing to the economy of the overall process; (6) Synergistic effects are possible by combining the steam treatment and AFEX, such as prehydrolysis of the cellulosic biomass with the mild acids produced during steaming which makes the AFEX process more effective.

Other objects and advantages and a more complete understanding of the invention may be obtained by referring to the following detailed description when taken in conjunction with the accompanying drawings.

BRIEF DESCRIPTION OF THE DRAWINGS

FIG. 2 is a schematic of a rotary lock hopper valve which may be used as an alternative to the swing valve of FIG. 1A.

FIG. 3 is a schematic of an ammonia absorber-still which may be used as an alternate to the compressor of FIG. 1B.

FIG. 4 is a schematic of a compressor-spray intercooler assembly which may be used as an alternate to the compressor of FIG. 1B.

FIG. 7 is a schematic of a series of AFEX assemblies which allows for repeated treatment of biomass.

FIG. 11 is a schematic of the AFEX process wherein ammonia drying and explosive depressurization are reversed.

DETAILED DESCRIPTION

A. Afex Process

Figure 1A:
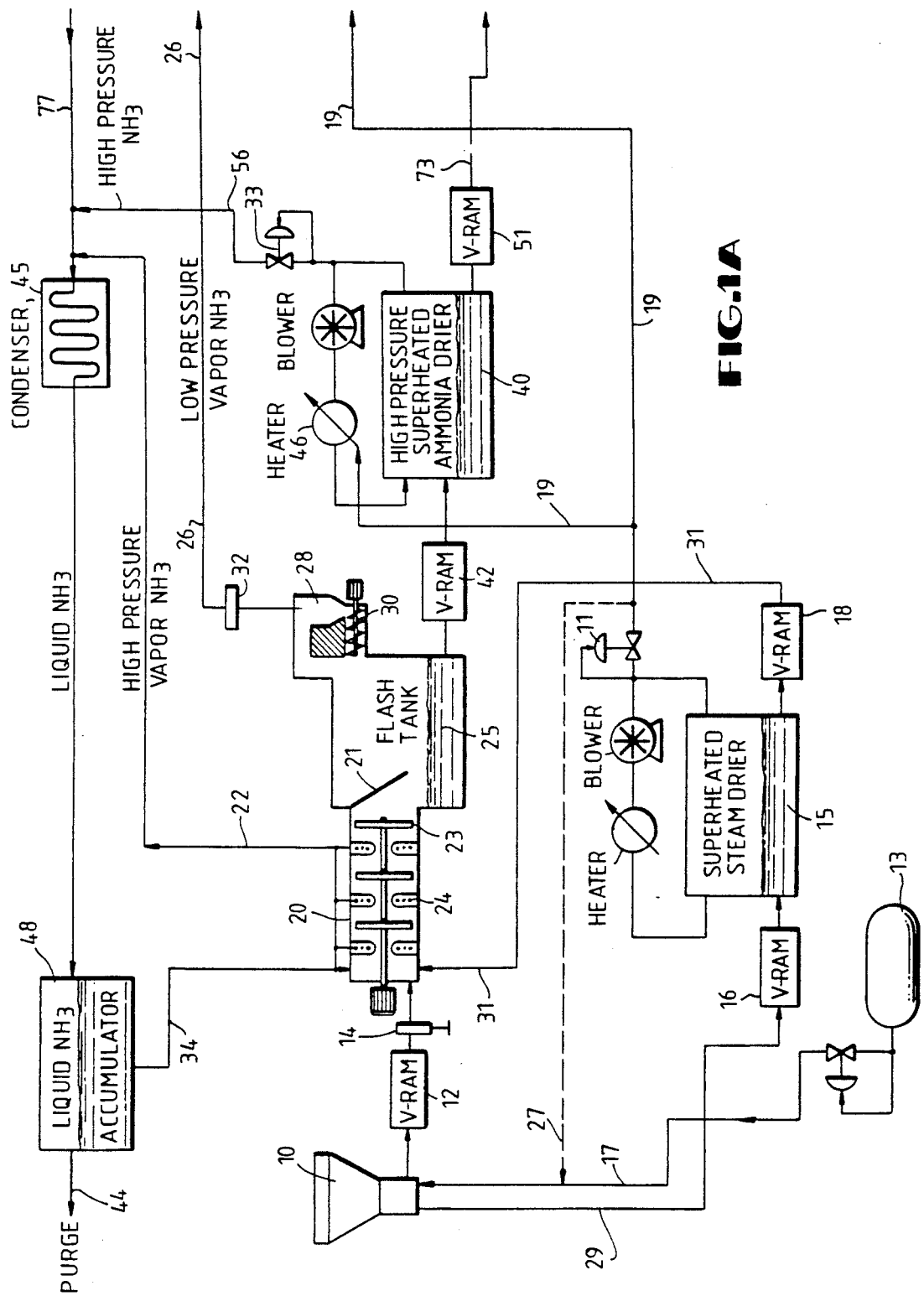
FIGS. 1A-1B show a schematic flow diagram of a biomass refining process illustrating an AFEX embodiment of the method and apparatus of the present invention.

According to one aspect of the present invention, biomass is treated with liquid ammonia or other appropriate swelling agent, exploded, and the swelling agent and treated biomass are recovered. Appropriate swelling agents include liquid ammonia, primary and secondary amines, liquid nitrogen dioxide, liquid sulfur dioxide, mixtures thereof, and the like. Preferably, liquid ammonia, monomethylamine or monoethylamine are employed in the process. Most preferably, liquid ammonia is used as the swelling agent.

FIG. 1 shows a schematic of an improved Ammonia Freeze Explosion ("AFEX") process. A solids pump 12, such as a V-Ram ™ pump or the like, takes a slug of biomass from the hopper 10 and compresses the biomass against a large valve 14, which is closed, and squeezes out as much air as possible. Excess air is purged. The large valve 14 is then opened which allows the biomass to enter the AFEX reactor 20.

The biomass may comprise any biopolymer-containing material capable of being swelled in the AFEX process. For example, the types of cellulosic biomass used may include coastal bermudagrass, hay, alfalfa, grass presscake, tree leaves, municipal solid waste, aquatic plants, cassava tops, cotton hulls, aspen chips, sawmill and logging residues, wheat straw, wheat chaff, barley straw, rice straw, corn stover, sugarcane bagasse, kochia stems, grain sorghum, corn kernels, corn cobs, wheat grain, oat grain, rice grain, the fiber component of a green, leafy biomass which has been subjected to protein extraction, or mixtures thereof. Additionally, other materials containing biopolymers such as starch; chitin from shrimp shells, crab shells, lobster shells, crawfish shells or insect exoskeletons; and other non-leafy protein materials such as hair, hoofs, feathers, and tendons may be subjected to the AFEX process.

As will be readily apparent to those skilled in the art, any conventional materials transport device may be employed in the present invention. Therefore, the terms used herein such as lock hopper, solids pump, screw conveyor, belt drive, or the like, are merely illustrative and are used herein to generally designate any apparatus which is capable of moving biomass.

Superheated steam ("SHS") may be allowed to flow counter-currently through conduit 17 into the biomass hopper 10, so that the biomass is preheated and air in the biomass is stripped or expelled. The steam utilized may be steam from a conventional boiler 13, or optionally, excess steam from an SHS drier in the process (via conduit 27) may be used. The preheated and air-free biomass is sent directly to AFEX or preferably via conduit 29 to an SHS drier 15 where it is forced into the drier by pump 16 and dried by contact with SHS at a temperature of from about 110° C. to about 260° C. The steam may be considerably hotter than the wet biomass since the wet biomass temperature is determined by the system pressure.

By sending biomass through an SHS drier prior to AFEX, the biomass is preheated to release mild organic acids which prehydrolyze the hemicellulose—i.e., the biomass is "softened" by the steam. Also, the biomass moisture content is optimized for maximum efficiency of AFEX. Although bone dry biomass or biomass having a moisture content of up to about 250% or more may be subjected to the AFEX process, in general, the optimum biomass moisture content is about 20%-30% total moisture on a dry basis. Low water content allows increased biomass digestibility to be attained in AFEX and aids in the recovery of ammonia post-AFEX. Hence, the SHS drier may be employed to reduce or adjust the water content of a biomass to a desired level by removing at least a portion of the water therefrom. Therefore, the expression "dried" as used herein will include a biomass or component in which the moisture level has been reduced to the desired level in a drying step and not necessarily a bone dry biomass or component.

Excess steam from the SHS drier 15 is passed through pressure regulator 11 and exits through conduit 19 to be used in the ammonia recovery system by heating ammonia for use in SHA driers 40 and 50, or, as discussed above, for deaerating the biomass. The now air-free and preheated biomass material will be injected by a solids pump 18 (via conduit 31) directly into the AFEX reactor 20 where a liquid swelling agent, such as ammonia, contacts the biomass. Since the biomass is hot, this allows more rapid decrystallization by the ammonia and some of the ammonia evaporates, cooling the biomass to near ambient temperature. The vapors produced by this evaporation will be withdrawn through conduit 22 at elevated pressure. This should reduce recompression costs since condensation of the high-pressure ammonia is possible by cooling with ambient air or water in condenser 45.

The expression "ambient" as used herein generally refers to temperatures usually encountered in the earth's atmosphere as well as similar room temperatures. Thus, ambient temperatures will usually fall within the range of from about −40° C. to about 60° C. The treatment temperatures in AFEX range generally from about ambient temperature to about 200° C. In general, higher treatment temperatures are required for certain types of biomass, such as biomass containing more than 15% lignin.

Advantageously, AFEX reactor 20 may contain a rotating shaft having fingers 23 which project outward. The wall of the reactor may also have fingers 24. The fingers 24 in the wall may conveniently have numerous holes which allow liquid ammonia to enter the AFEX reactor 20. The rotation of the shaft causes intimate mixing of the ammonia with the biomass. The biomass is preferably held in the reactor from about 5 to about 30 minutes which causes the biomass to swell and decrystallize. When the reaction is complete, the rotating shaft stops in a position where its fingers 23 are aligned with the fingers 24 of the wall. A large swing-valve 21 at the end of the reactor opens resulting in a flash blowdown, which allows the biomass to explode into a blowdown or flash tank 25. As will be readily apparent, any conventional valve apparatus may be employed in the AFEX reactor, including, but not limited to, a swing-valve, gate-valve, knife-valve, lock hopper, and ball-valve.

Referring to FIG. 2 a rotary lock hopper or pressure reduction wheel 140 can be used as an alternative to the swing valve 21 shown in FIG. 1A. A specific example of such a rotary lock hopper is the Flo-Tronics TM rotary airlock feeder manufactured by Allied Industries, Houston, Tex. In this process, the rotating wheel with multiple segmented chambers picks up a batch of material in a chamber from a vessel on one side of the wheel casing at one pressure, in this case reactor 141, then delivers to the other side of the casing to a vessel at a different pressure, flash tank 142. Biomass soaked in ammonia and moved in this manner at rates which allow the expansion to occur in less than approximately one second, results in significant disruption of the biomass.

Depending on the initial and final pressure and biomass water content, approximately 25% of the ammonia flashes during the flash blowdown. Referring again to FIG. 1 the fingers of the agitator and wall may be aligned to minimize blockage of the biomass so it will freely explode into the flash tank 25. The flash tank 25 may be adapted to service several AFEX reactors. The apparatus may also be adapted to have several flash tanks. However, the present invention is not limited to a particular AFEX reactor design. Any pressure vessel which allows biomass to be contacted with a swelling agent and subsequently allows a rapid pressure release to flash or explode the biomass may be employed by the present invention.

The treatment pressures in AFEX range from about 7 atmospheres "atm" (absolute) to about 35 atm (absolute), and preferably from about 13 atm to about 20 atm (absolute). Contact between the biomass and swelling agent is for a period of time sufficient for the agent to swell the biomass. For example, treatment times of from about 0.1 to about 3 hours may be employed. Preferably, treatment times of about 3 to 30 minutes will be employed. When the biomass is preheated in an SHS drier, this will normally result in reduced soak time due to the softening effect discussed above.

The flash blowdown which follows the soaking procedure is a rapid, explosive pressure release which preferably takes less than about two seconds and most preferably takes place in less than about 0.5 seconds. The pressure may be rapidly reduced to atmospheric or to a pressure other than atmospheric. The important aspect of the flash blowdown is an explosive depressurization that is sufficient to cause the biomass to rupture and thereby release and/or expose the various biomass components and increase the surface area of the biomass.

It will be noted that the flash blowdown may be conducted directly from the reactor or from a separate chamber. Thus, biomass following treatment may be moved under pressure through lock hopper valves or the like from the reactor to a separate chamber. Pressure in the reactor may thereby be maintained, and blowdown conducted from the separate chamber.

During the flash blowdown, some biomass may be caught in the flow of ammonia vapors, so a cyclone 28 or the like is advantageously used to separate out solid particles. The solid particles which settle to the bottom of the cyclone may be transported back to the flash tank 25 using a screw conveyor 30 or the like. A filter 32 removes any fine particles which may remain in the ammonia vapors withdrawn through conduit 26. This protects the compressor 35.

In FIG. 3 an alternative to the compressor 35 (FIG. 1B) is exemplified. Low-pressure ammonia vapors from conduit 26 and 64 (in FIG. 1A–B) enter the ammonia vapor absorber 39 via conduit 41 countercurrent to the flow of water from conduit 57. The temperature of the absorber 39 is maintained by cooling water which passes through conduit 61. The vapors are absorbed by the water stream which passes through the absorber 39 out conduit 63 via pump 43 and through counter-current heat exchanger 59. The ammonia/water stream then continues through conduit 63 into the high-pressure still 47. High-pressure ammonia vapors exit through the top of the still 47 and are liquefied in the condenser 51. The liquid ammonia exits through conduit 53 to the accumulator 48 (FIG. 1A).

Turning now to FIG. 4, another alternative to the compressor 35 (FIG. 1B) is exemplified. In this embodiment, an assembly comprising a spray intercooler 36, between two compressors 37 and 38, is employed. Low-pressure ammonia vapors from conduits 26 and 64 enter the first compressor 37. The spray intercooler 36 cools the superheated vapors which exit the first compressor 37. This saves energy (about 10%) and prevents the second compressor 38 from becoming overheated. The high-pressure vapors are liquefied in condenser 45 (FIG. 1A) and the liquid ammonia is collected in an accumulator 48 (FIG. 1A). Any noncondensible gases which have entered the system are purged through conduit 44 (FIG. 1), preferably to a fermentor so the organisms can use the ammonia as a nitrogen source.

The liquid ammonia is returned through conduit 34 to the AFEX reactor 20.

Continuing in FIG. 1, solids pump 42 moves the exploded material which collects at the bottom of the flash tank 25 into a high-pressure (e.g., about 14 atm (absolute)) superheated ammonia ("SHA") drier 40 which operates from about 35° C. to about 200° C. It is preferred that the high-pressure SHA drier is run at a pressure sufficiently high such that the ammonia can be condensed by ambient media such as air or water.

Figure 5:
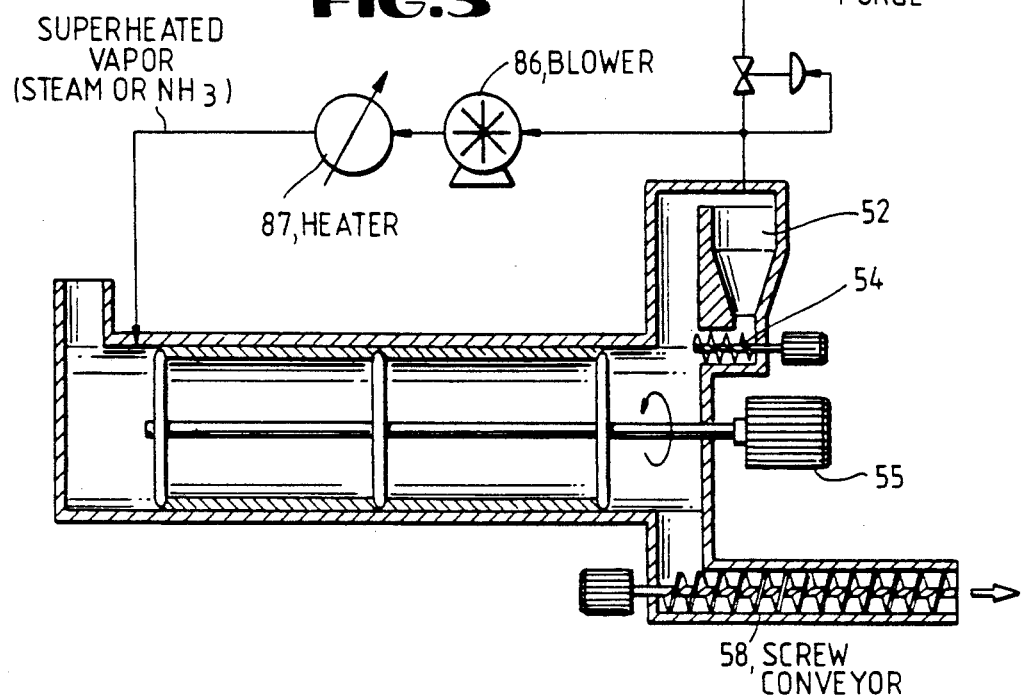
FIG. 5 is a schematic of a superheated vapor drier which may be used at high or lowpressure in the method and apparatus of the present invention.

Referring to FIG. 5, which shows a high-pressure drier in greater detail, the exploded biomass is tumbled by motor 55 and contacted with superheated ammonia vapor. The entrance temperature of the vapor is usually about 120° C. or higher and the exit temperature is usually about 105° C. or higher. Preferably, the temperature of the ammonia-soaked biomass in the drier is about 37° C. or higher. The vapor exits through a cyclone 52 where large particles are separated out. A screw conveyor 54, or the like, is used to return the solids to the high-pressure drier. The vapors may be heated by circulation through a heat exchanger 87 using a blower 86. Alternatively, heat may be introduced directly into the drier through heated walls and tubes located inside as is done with a steam-tube drier. This approach is more difficult to implement, since steam-tube driers normally tumble which makes it difficult to seal the high-pressure ammonia. The dried biomass exits the drier through a screw conveyor 58 or other conventional materials transport device, such as the V-ram pump 51 (FIG. 1A). It will be noted that the drier configuration of FIG. 5 is equally suitable for use as a superheated steam drier.

Continuing in FIG. 1, the excess high-pressure ammonia vapors pass through the pressure regulator 33 and are fed directly to the condenser 45 through conduit 56. Since a compressor is not required, there is an energy savings compared to recovering all the ammonia at low-pressure. Approximately 50% or more of the ammonia in the exploded biomass is removed in the high-pressure SHA drier 40. When water is present in the biomass, it is difficult to remove all of the ammonia at a high-pressure.

Figure 1B:
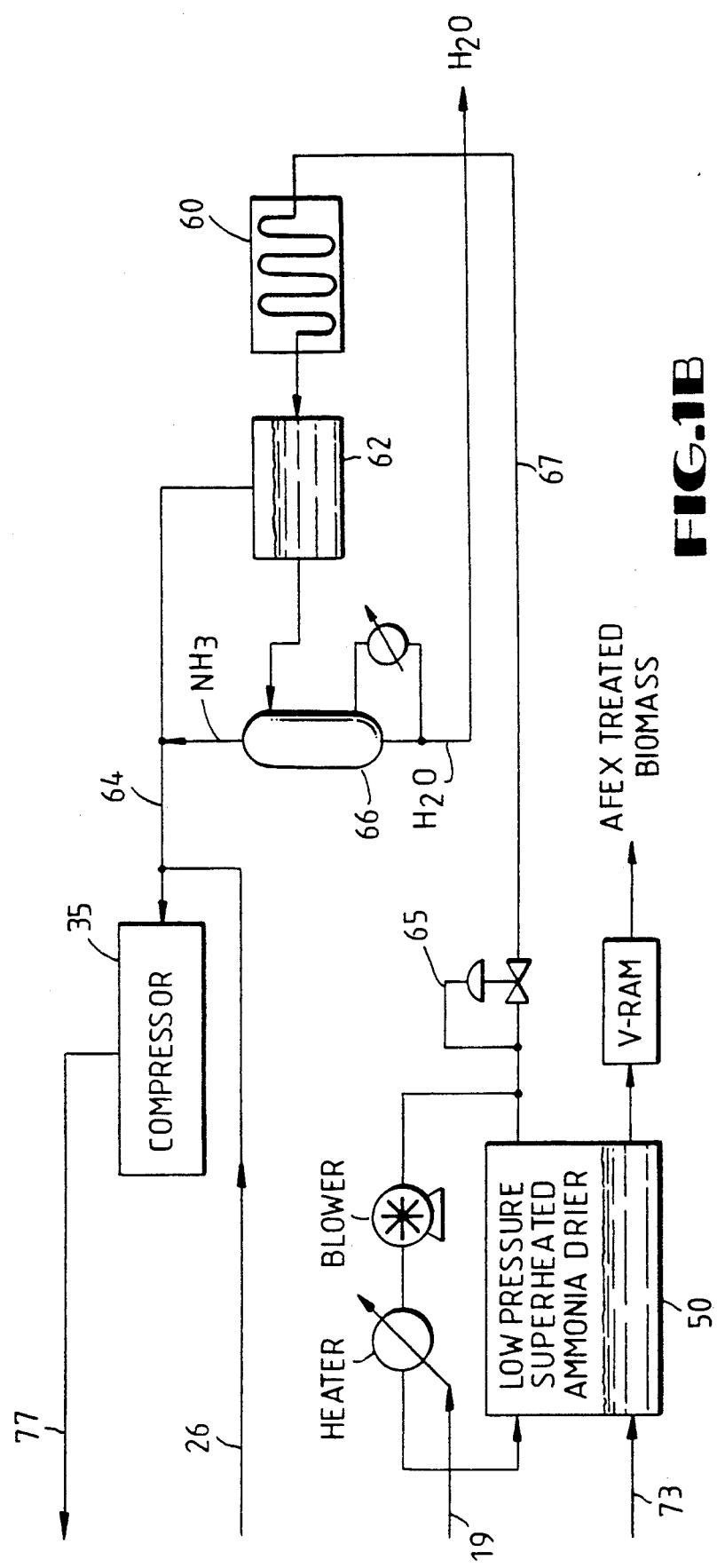

When all of the ammonia cannot be removed at a high-pressure, a solids pump 51, screw conveyor, lock hopper, or like device transfers the AFEXed biomass from the high-pressure SHA drier 40 to a low-pressure SHA drier 50 (FIG. 1B). Because the pressure is reduced relative to the high-pressure drier, it is possible to remove substantially all of the remaining ammonia from the biomass even if water is present. The low-pressure SHA drier 50 is similar to the high-pressure drier 40 in design and operation. The AFEX treated biomass which exits the low-pressure SHA drier is removed using a screw conveyor 58 (FIG. 5), a V-ram pump 51 (FIG. 1) or the like.

The vapors which exit the low-pressure SHA drier may be partially recovered in condenser 60 after passage through the pressure regulator 65 and the conduit 67. The liquid is separated from the vapors in separator 62 where the ammonia-rich vapors are sent to the compressor 35 through conduit 64. The remaining ammonia/water liquid is sent to an ammonia stripper 66 where the water is removed from the ammonia.

Since the AFEX process does not degrade the biomass, it may be repeated numerous times to further improve digestibility and achieve a greater reactivity of the biomass to enzymatic hydrolysis. In FIG. 7, a schematic for two AFEX treatments in series is shown, although more treatments may also be used. As previously described, biomass is loaded into the AFEX reactor 112 where liquid ammonia typically penetrates the biomass fibers at ambient temperature and about 14 atm (absolute). After an appropriate soak (about 10-15 minutes), the pressure is rapidly reduced by popping the valve 111 which causes the biomass to explode into tank 115 such that the ammonia violently vaporizes and disrupts the fibrous structure. After soaking the biomass in reactor 116 for an appropriate length of time (about 10-15 minutes), the pressure is again rapidly reduced by opening valve 117, allowing the liquid ammonia to violently vaporize into flash tank 118.

Figure 8:
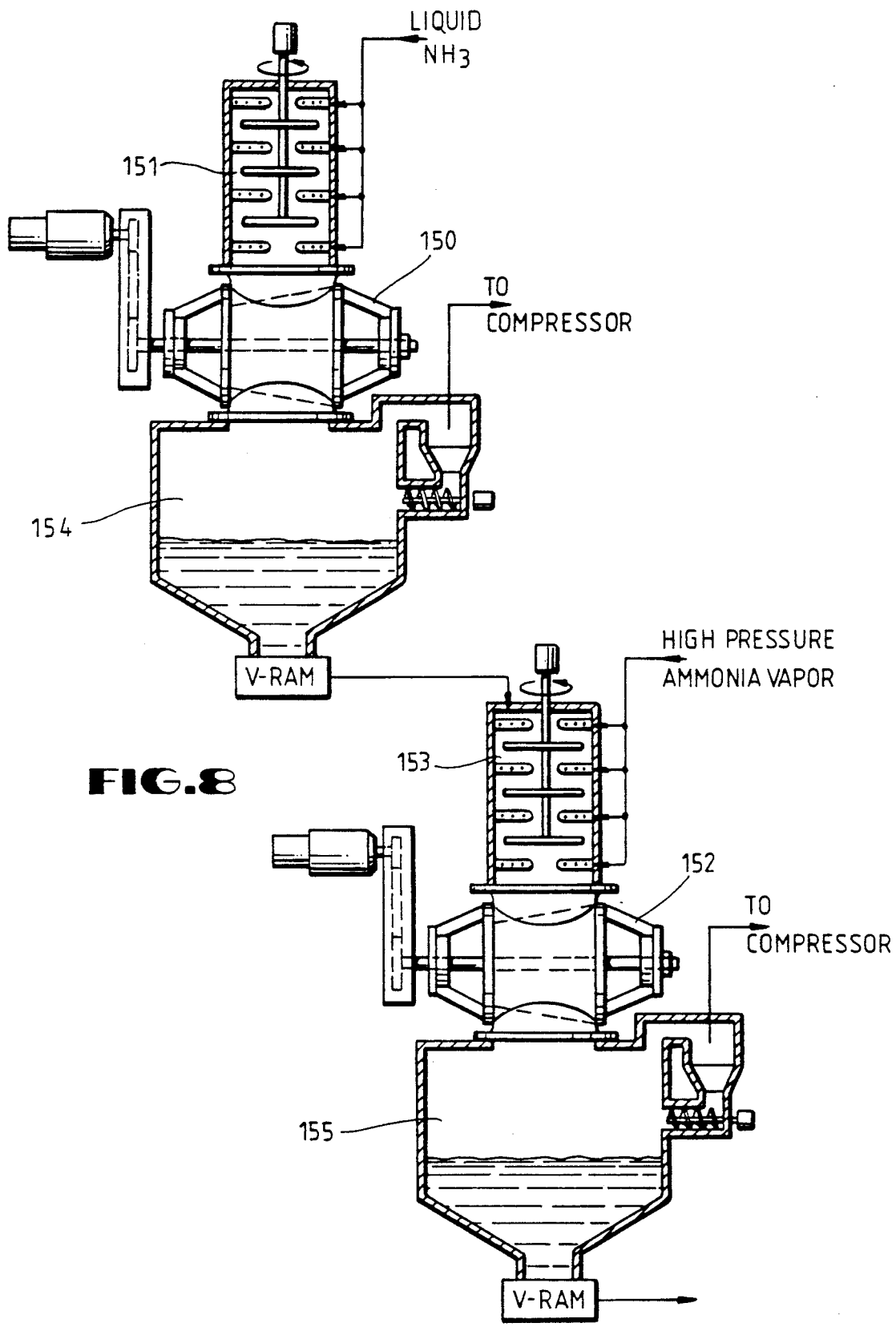
FIG. 8 is a schematic of a series of AFEX assemblies employing a rotary lock hopper for repeated treatment of biomass.

In FIG. 8 a schematic for multiple AFEX treatments in series is shown using the rotary lock hopper in conjuction with the AFEX reactor as previously described in FIG. 2. In this embodiment multiple explosions are achieved as discussed with reference to FIG. 7; however, rotary lock hoppers 150 and 152 replace valves 111 and 117 referenced in FIG. 2. Biomass is exploded from reactors 151 and 153 into flash tanks 154 and 155 by operation of rotary lock hoppers 150 and 152.

Referring again to FIG. 7, usually, the biomass is cold due to the rapid pressure release and ammonia vaporization. In general, the biomass should be reheated prior to placement in the second reactor 116. In one embodiment, high-pressure ammonia vapors are fed to the reactor 116 via conduit 119 causing the biomass to be reheated to room temperature and condensing the ammonia. While the biomass is cold, the source of high-pressure ammonia vapors may be the superheated vapors exiting the first compressor 37 (FIG. 4). Once the biomass becomes warm, the superheated vapors exiting the second compressor 38 (FIG. 4) may be used. Using the vapors exiting a compressor results in an energy savings, particularly when the biomass pressure is less than the ammonia pressure in the condenser 45 (FIG. 1). When this condition is no longer satisfied, vapors exiting the high-pressure SHA drier 40 (FIG. 1) via conduit 56 may be employed to reheat the biomass.

Figure 9:
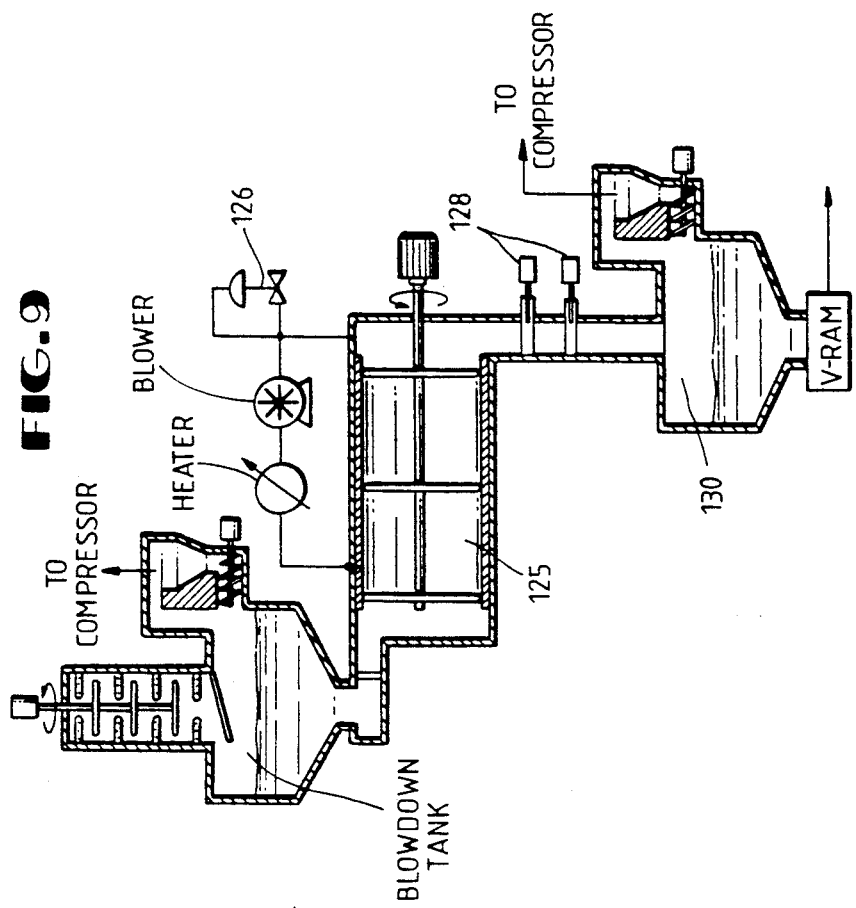
FIGS. 9-10 show schematics of the AFEX process wherein a heating step is disposed between explosive depressurization steps.
Figure 10:
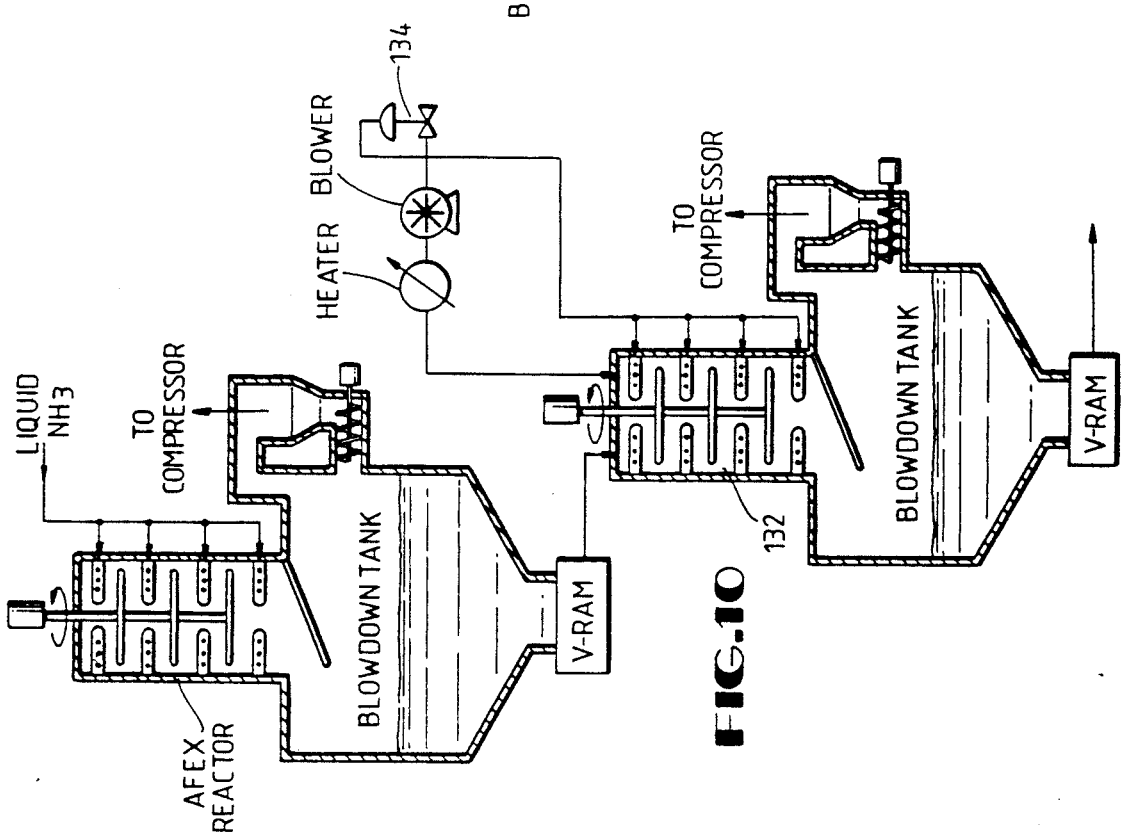
Figure 12A:
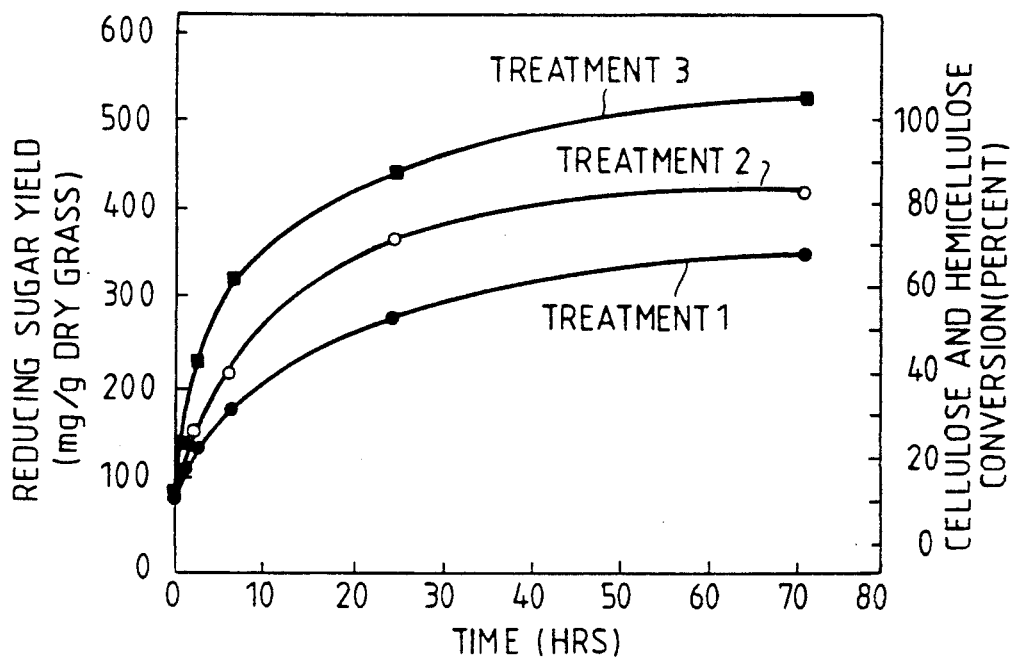
FIGS. 12A-12D show enzymatic hydrolysis data for Coastal bermudagrass in which up to three AFEX treatments were employed using four different final blowdown pressures. (Note: Percent hydrolysis scale is approximate.)
Figure 12B:
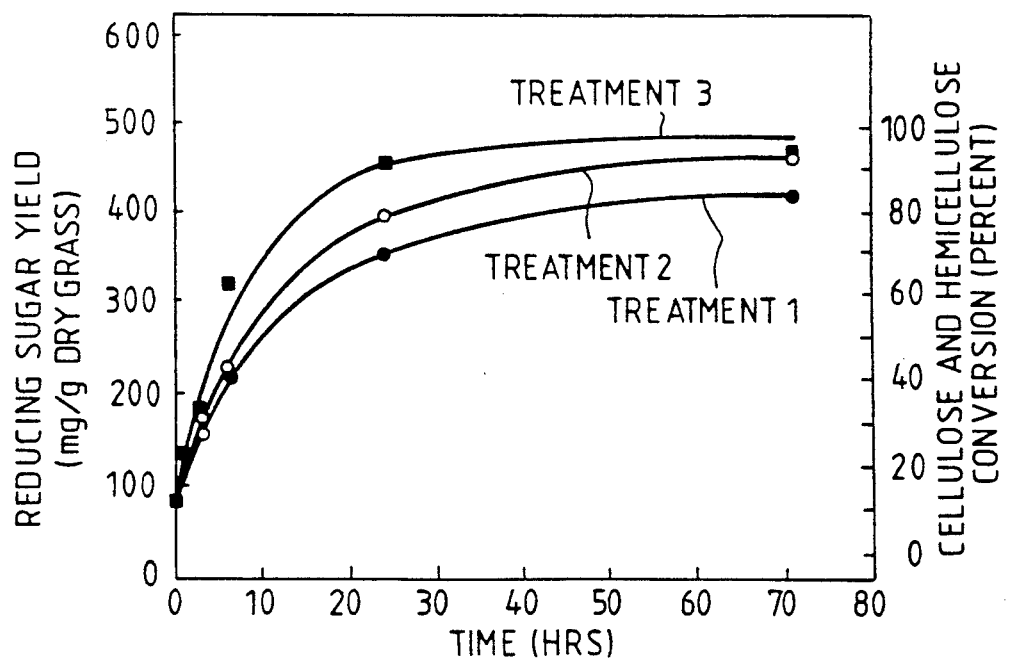
Figure 12C:
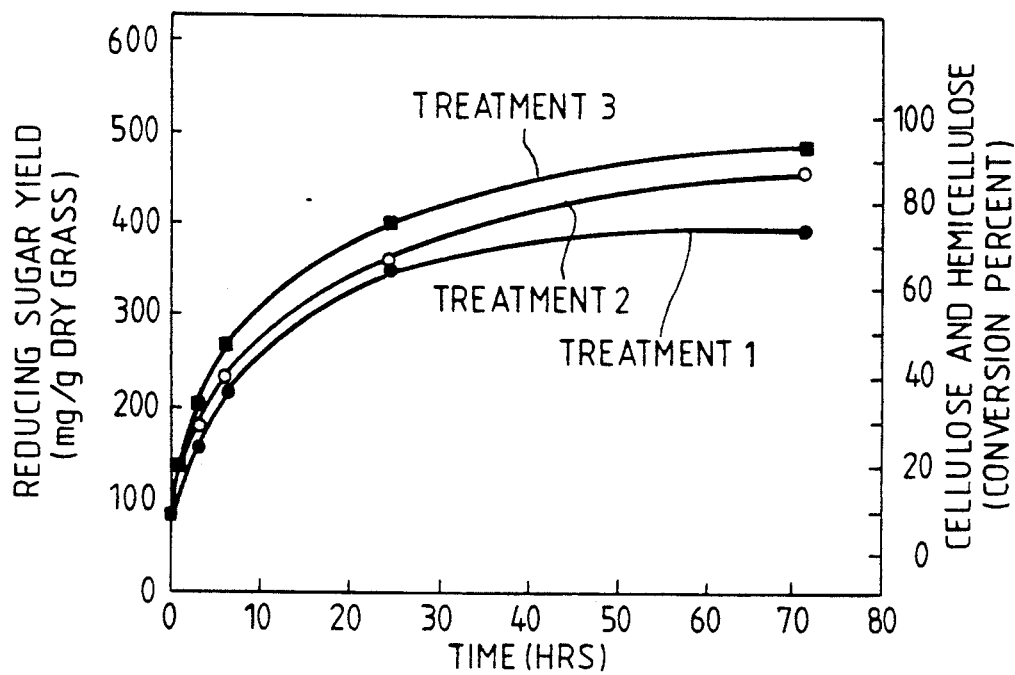
Figure 12D:
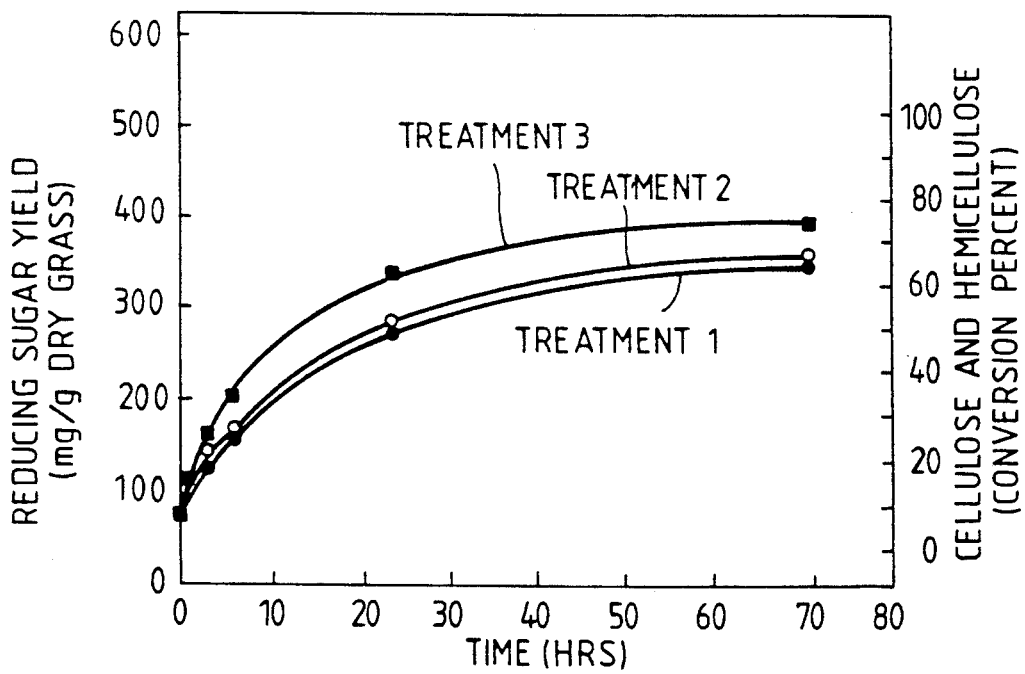

An alternative approach to introducing hot ammonia vapors directly on to the biomass is exemplified in FIGS. 9-10. Essentially, a heater is placed between the explosion steps to raise the biomass temperature sufficiently for it to blow again.

As shown in FIG. 9, this can be accomplished in a heater 125 which is similar to the SHA driers. The important difference is that no vapors are removed from the heater 125; the hot circulating ammonia vapors simply warm the biomass. A pressure controller 126 is used to regulate the heat input and prevents the pressure from becoming excessive. Once the biomass is warm, it is blown into a low-pressure chamber via lock hopper valves 128. The lock hopper valves operate by opening the first valve while the second valve remains closed. A slug of biomass falls into the chamber between the valves. The first valve then closes and the second valve opens, discharging the slug into the blowdown tank 130.

A similar approach is schematically shown in FIG. 10 wherein an AFEX reactor 132 is modified to reheat the biomass directly. As above, no vapors are removed from the reactor/heater apparatus. The hot circulating ammonia vapors warm the biomass while a pressure controller 134 regulates the heat input and prevents the pressure from becoming excessive.

The AFEX process variation discussed above may be repeated as many times as desired until the ammonia runs out (approximately 0.15 kg ammonia is flashed per kg of biomass, depending on the final blowdown pressure). If necessary, the initial amount of ammonia added to the biomass could be increased to ensure enough is present for all the blowdowns. Also, the temperature and pressure in each heater is usually similar to that in an AFEX reactor. The blowdown pressures are the same as previously discussed.

The approach to the AFEX process described thus far is to: 1) contact the biomass with a volatile swelling agent such as liquid ammonia to decrystallize the biomass, 2) subject the biomass to a flash blowdown, 3) dry the biomass at a high-pressure, and 4) dry the biomass at a low-pressure. As much ammonia as possible is removed at the high-pressure, until the water content becomes so high that further removal is not reasonable unless extremely high temperatures are employed. The remaining ammonia can advantageously be recovered at low-pressure. In this approach to AFEX, virtually pure ammonia is vaporized during the explosive depressurization which is then recompressed. To save energy, it becomes desirable to recover this ammonia at a high-pressure so it need not be recompressed. This may be accomplished by reversing steps (2) and (3) so the sequence now becomes: 1) contact the biomass with liquid ammonia to decrystallize the biomass, 2) dry the biomass at a high-pressure, 3) subject the biomass to a flash blowdown, and 4) dry the biomass at a low-pressure.

To illustrate the energy savings that result from reversing steps (2) and (3), consider a case where 1lb. of dry biomass is wetted with 1 lb. ammonia and 0.1 lb. water during the contact phase (Step 1). A comparison of the amount of ammonia and water recovered in each subsequent step for the two approaches is as follows:

| Process Step | | Material Recovered | | |
|---|---|---|---|---|
| | | Approach 1 | | |
| 1) | contact | Low Pressure NH$_3$ | Low Pressure NH$_3$ | High Pressure H$_2$O |
| 2) | flash blowdown | 0.25 lb | — | — |
| 3) | high-pressure drying | — | — | 0.5 lb |
| 4) | low-pressure drying | 0.25 lb | 0.1 lb | — |
| | Total Recovery | 0.50 lb | 0.1 lb | 0.50 lb |
| | | Approach 2 | | |
| 1) | contact | Low Pressure NH$_3$ | Low Pressure NH$_3$ | High Pressure H$_2$O |
| 2) | high-pressure drying | — | — | 0.75 lb |
| 3) | flash blowdown | 0.15 lb | — | — |
| 4) | low-pressure drying | 0.10 lb | 0.1 lb | — |
| | Total Recovery | 0.25 lb | 0.1 lb | 0.75 lb |

In the first approach, about 50% of the ammonia is recovered at low-pressure and the remainder is recovered at high-pressure. In the second approach, only about 25% of the ammonia is recovered at low-pressure, thus saving about half the compression cost. The remainder of the ammonia is recovered at high-pressure so recompression is not required. It should be noted that the amount for ammonia and water recovered in each step is highly dependent on the operating temperature and pressure so the above numbers are to be viewed as "typical" values for illustrative purposes, and not exact values.

This procedure is schematically illustrated in FIG. 11, where biomass is introduced into the AFEX reactor 120 and soaked with liquid ammonia for an appropriate time. The ammonia-soaked biomass is then transferred to a high-pressure SHA drier 122 to remove about 75% of the ammonia. Since the ammonia is removed at an elevated pressure, it may be liquified by condenser 45 (FIG. 1) after passing through pressure regulator 121. The swollen biomass is then passed through valve apparatus 124 and exploded into the flash tank 125. The remaining ammonia is removed from the biomass in the low-pressure SHA drier 130 and partially recovered in condenser 60 (FIG. 1) after passage through the pressure regulator 128.

The following example is presented to demonstrate both the single and multiple explosion AFEX procedures of the present invention and should not be construed as limiting the appended claims.

EXAMPLE

1. AFEX Treatment 150 grams of wet Coastal bermudagrass containing 105 g dry matter and 45 g water was soaked overnight (water loading = 0.429 kg water/g dry grass). This material was placed in a 4-L pressure vessel (Autoclave Engineers, Erie, Pa.) wrapped with heating tape which maintained the reactor temperature at 47° C. While stirring the reactor contents, 105 g of anhydrous ammonia was added (ammonia loading = 1 kg ammonia/kg dry grass). The pressure was 11.2 atm. After 15 min, a 2.85-cm air-actuated ball valve was opened releasing the pressure to a 225-L tank. The initial pressure in the tank was adjusted with nitrogen gas allowing the final blowdown pressure of the reactor to be regulated. The following table indicates the initial and final tank pressure.

| Initial Tank Pressure (atm absolute) | Final Tank Pressure (atm absolute) |
|---|---|
| 1.00 | 1.4 |
| 2.00 | 2.36 |
| 2.70 | 2.97 |
| 3.72 | 4.00 |

Since the reactor pressure and tank pressure equilibrate, the final tank pressure is the "blowdown pressure" of the reactor.

After the blowdown, nitrogen was purged through the reactor to strip ammonia from the grass. The material was then removed from the reactor and also from a filter which prevented entrained grass form entering the 225-L tank. This material was air dried to remove traces of ammonia.

30 g of the air-dried material was "harvested" so it could be enzymatically hydrolyzed. The remaining material was soaked with water overnight using the same water loading (0.429 kg water/kg dry grass). It was placed in the pressure vessel and treated with the same ammonia loading (1 kg ammonia/kg dry grass), same temperature (47° C.), same time (15 min), and same pressure to the 225-L tank. The material was again purged with nitrogen to remove remaining ammonia. It was removed from the reactor and air dried to remove the final traces of ammonia.

30 g of this air-dried material was "harvested" and the process was repeated.

2. Enzymatic Hydrolysis

A 500 mL Erlenmeyer flask contained 149.1 mL of 0.05 M pH 4.8 citrate buffer with 0.03% sodium azide as a microbial inhibitor. 0.284 g of Genecor 300 P cellulase powder (South San Francisco, Calif.) was placed in the flask. It had an activity of 132 IU/g dry powder as measured by the standard filter paper assay (M. Mandels, R. Andreotti and C. Roche, *Biotechnol. & Bioeng. Symp. No.* 6, p. 21 (1976)), so the enzyme loading was 5 IU/g dry grass. In addition, 0.852 mL of Novo 188 cellobiose liquid (Wilton, Conn.) was placed in the flask. The cellobiose liquid had an activity of 250 CBU/mL where the cellobiose units (CBU's) are measured by a standard Novo assay. Thus, the cellobiose loading was 28.4 CBU/g dry grass. This solution of buffer and enzymes was heated in a shaking water bath to the reaction temperature (50° C.). Air-dried AFEX-treated material containing 7.5 g of dry grass was added to the Erlenmeyer flask. The reaction proceeded for three days with 1-mL liquid samples drawn periodically. The sugar concentration of the liquid was measured using the DNS reducing sugar assay (G.L. Miller, *Anal Chem.*, 31, 426 (1959)). Glucose was used as the calibration standard.

3. Results

FIGS. 12A-12D shows the hydrolysis results for Coastal bermudagrass in which the AFEX process has been repeated up to three times. Four different final blowdown pressures were explored; 1.40 atm, 2.36 atm, 2.97 atm, and 4.00 atm. The results were similar except for the 4.00 atm blowdown which didn't produce as much sugar as the other blowdown pressures. As the number of AFEX treatments increased, the material became more reactive, i.e., the sugar yields increased. The best treatment (three AFEX treatments, 1.40 atm blowdown) produced about 500 mg reducing sugar/g dry grass. This is approximately 100% conversion of the cellulose and hemicellulose. The conversion is only approximate since it is very difficult to precisely measure the cellulose and hemicellulose content and because all the reducing sugars are compared to a glucose standard when in fact the sugars are a mixture of glucose, cellobiose, and xylose.

The optimal values for AFEX parameters such as soak temperature, soak time, ammonia loading, water content, number of flash blowdowns, blowdown pressure, and particle size for any type of biomass can be determined by those skilled in the art by conducting a similar survey procedure.

II. PROTEIN EXTRACTION PROCESS

Figure 13:
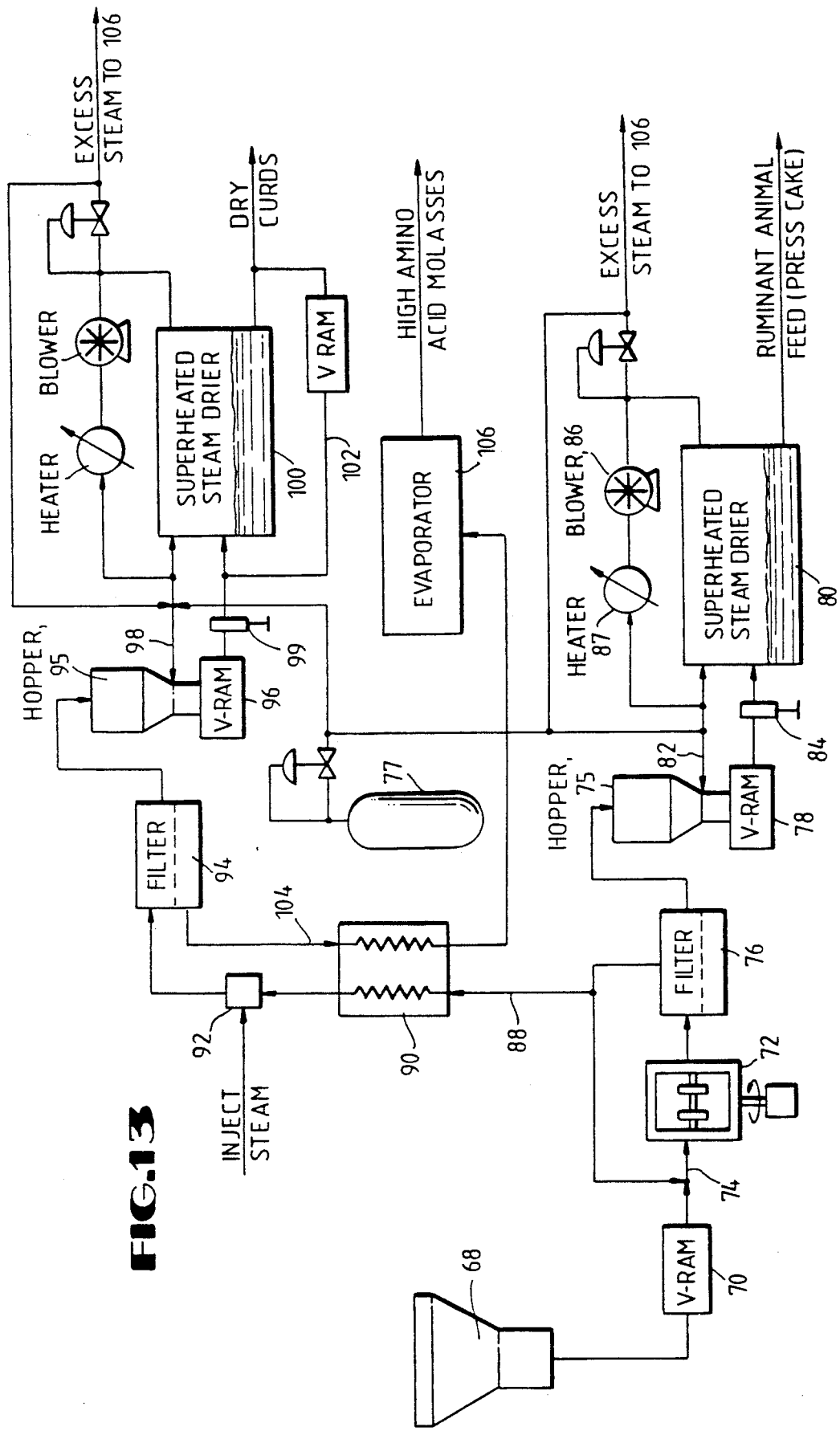
FIG. 13 is a schematic flow diagram of a biomass refining process illustrating a protein extraction embodiment of the method and apparatus of the present invention.

FIG. 13 shows a schematic of a protein extraction process according to the present invention. In one embodiment a freshly harvested biomass is moved from hopper 68 by solids pump 70 into an in-line homogenizer 72. The biomass may comprise any protein-containing biomass wherein the protein component is capable of being separated from non-proteins such as fiber. For example, the types of biomass suitable for protein extraction include alfalfa, sorghum, clover, field beans, mustard kale, fodder radish, banana leaves, aquatic plants, grasses, and mixtures thereof. In a preferred embodiment, a liquid stream which contains all the soluble components of the biomass (including protein) is combined with the grass on an equal weight basis through conduit 74; that is, approximately 1 lb. of wet grass is mixed with approximately 1 lb. of liquid. This slurry is fed to the in-line homogenizer 72. The homogenizer grinds the grass sufficiently to break open nearly all the cells, but not so finely that the fibers become difficult to filter. In lieu of the homogenizer, the present invention may employ a grinder, hammer mill or other comminution device known in the art. Advantageously, the in-line homogenizer is used so that it will break open many more of the cells than a device such as a hammer mill used in conventional protein extraction processes, and will enable more protein to be released.

The homogenate is then filtered using a filter 76, such as a Larox ® filter or the like to separate the solid fiber component of the biomass from the juice. The filter 76 may be designed to allow very high solids concentrations to be achieved. For example, the Larox ® filter works as follows: The solid/liquid mixture is pumped into a chamber which has a filter cloth on the bottom. A rubber bladder located above the solid/liquid mixture is pressurized with air which forces the liquid out through the filter cloth. Very high bladder pressures can be used to help ensure the solids are squeezed to a lower water content. Then, the solids which are retained on the cloth may be washed. Lastly, air can be blown through the solids to remove interstitial water.

After the above processing, the fiber component is conveyed out of the filter 76 to a hopper 75. A solids pump 78 forces the fiber component into a SHS drier 80. The fibrous solids may be compressed by the pump 78 as tightly as possible to expel air, or alternatively, superheated steam may be forced countercurrently through conduit 82 into the fiber while it is still in the hopper 75 to the deaerate the biomass fiber. The steam utilized may be excess steam from the SHS drier or steam from a conventional boiler 77. Then the valve 84 is opened which allows the biomass fiber to enter the SHS drier 80.

As shown in FIG. 5, one configuration of an SHS drier is as follows: the solid contents of the steam drier are agitated by a motor 55. The gently tumbled solids have a stream of superheated steam flowing through them which is circulated by a blower 86 through a heat exchanger 87. The superheated steam provides the heat needed to evaporate water from the solid material. This process is carried out at about 2.4 atm (absolute) so that excess steam produced in the drier may be used for process heat elsewhere in the plant such as the juice evaporator 106 (FIG. 2), the steam injector 92 (FIG. 2), the heater 46 (FIG. 1A), distillation reboiler (FIG. 3), distillation reboiler (FIG. 1B), or to deaerate the biomass or a solid form component such as fiber or solidified protein. A cyclone 52 (FIG. 5) helps ensure that solid particles entrained in the steam flow are removed. A screw conveyor 54 (FIG. 5) or the like returns the particles to the drier. However, the present invention is not limited to a particular SHS drier design. Any drier which allows biomass to be contacted with super heated steam at an elevated pressure such that excess steam is produced may be employed by the present invention.

Continuing in FIG. 13, the juice or extract which has been previously squeezed out of the leafy biomass initially flows through a conduit 88 to a countercurrent heat exchanger 90 where the juice is heated to about 50° C. In some cases, this precipitates about ⅓ of the protein. Usually, the protein is precipitated by raising the juice temperature in the vicinity of about 50° C. to about 100°

C. by steam injection at port 92. In general, temperatures of about 85° C. are sufficient to coagulate the soluble proteins. Excess steam from SHS driers 80 and 100 may be used for this purpose. The protein may be removed from the juice by a Larox ® filter 94 or the like.

Protein curd from the filter is transferred to hopper 95 and then removed using a solids pump 96. The pump 96 compresses the curd as tightly as possible to expel air, or alternatively superheated steam may be injected counter-currently through conduit 98 into the protein component while it is still in the hopper 95 to deaerate the protein curd. Then the valve 99 is opened allowing the compressed protein curd to enter the SHS drier 100. Preferably, some of the dry curds may be recirculated through conduit 102 back to the entrance of the SHS drier 100 to help prevent caking in the drier. The SHS drier 100 used to dry the protein may be identical to the SHS drier 80 used to dry the fiber component or may be different in size. The excess steam produced in this drier is also at about 2.4 atm (absolute) so it may be used for other process heat. The protein curd is usually dried at about 127° C.

The remaining juice which leaves the protein filter through conduit 104 contains amino acids, free sugars, and minerals in a very dilute aqueous stream. These valuable components are passed through the heat exchanger 90 and recovered by concentrating them in an evaporator 106 which yields a "molasses".

Figure 6:
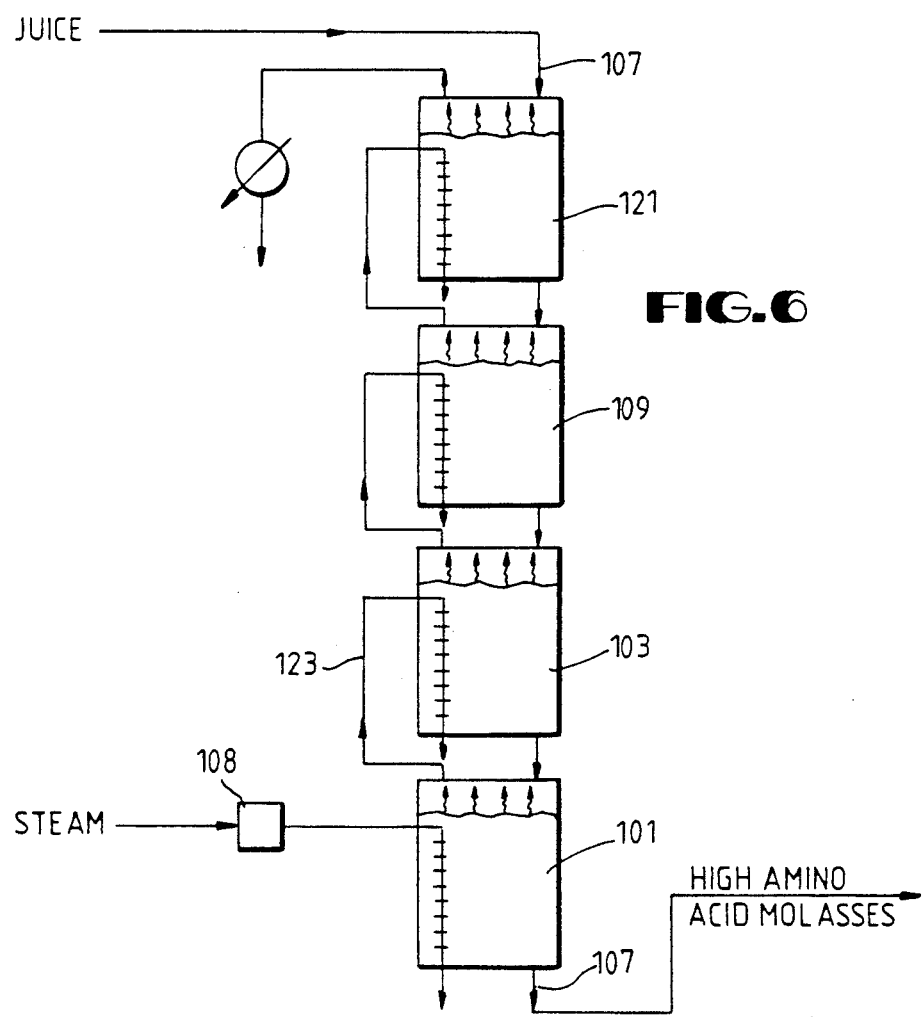
FIG. 6 is a schematic of a quadruple effect evaporator which may be used in lieu of the evaporator of FIG. 2.

As shown in FIG. 6, a quadruple effect evaporator may advantageously be used in lieu of evaporator 106 (FIG. 13). The steam produced in the SHS driers 80 and 100 (both in FIG. 13) may be used to facilitate the evaporation. Usually, only a small supplemental steam supply will be needed to complete the evaporation. Example, when steam enters the quadruple effect evaporator via port 108 at about 121° C. it raises the temperature of the juice in the first effect 101 to about 100° C. at 1 atm. As the juice in 101 evaporates, the 100° C. evaporation steam exits through conduit 123 into the second effect 103 heating the juice therein to about 82° C. at about 0.8 atm. In a similar fashion, the juice in effect 109 is heated to about 60° C. at about 0.5 atm and the juice in 121 is heated to about 38° C. at about 0.2 atm. In a preferred embodiment, the amino acid/sugar solution flows through conduit 107 which is countercurrent to the flow of steam in the evaporator. In this manner, the most concentrated molasses is at the higher temperature which reduces the viscosity for ease of heat transfer.

As will be readily apparent to those skilled in the art, the protein extraction and AFEX process discussed above may be employed separately or in combination to treat various biomasses depending upon the desired results. Particularly for protein-containing biomasses, the processes may advantageously be combined both to extract protein and to enhance the food value of the fiber component. Similarly, the various embodiments of the process such as:

a. AFEX sequence (e.g., soak-blow-dry vs. soak-dry-blow);
b. Single vs. multiple blowdown explosions;
c. Presence or absence of a steam drier;
d. Ammonia removal system (e.g., high-pressure, high-pressure plus low-pressure, etc.);
e. Compression system (e.g., compressor, absorber, etc.)
f. Presence or absence of protein squeeze; and
g. Presence or absence of biomass deaeration, may be varied as desired to refine a particular biomass.

For the purposes of the appended claims and the foregoing disclosure, the term "biomass" is intended to include raw biomass or any solid form component of raw biomass such as insoluble fiber and solidified proteins, except where expressly stated otherwise. Other biomass components such as soluble proteins, amino acids, free sugars, and minerals are referred to as "juice" or "molasses".

The foregoing description has been directed to particular embodiments of the apparatus and method of the present invention in order to comply with the requirements of the United States patent statutes. It will be apparent to those skilled in this art, however, that many modifications and changes in the apparatus and methods set forth above will be possible without departing from the spirit and scope of the invention. It is intended that the following claims be interpreted to embrace all such modifications and changes as will be apparent to one having ordinary skill in this technology.

We claim:

1. A method for refining a biomass which comprises:
    contacting the biomass or solid form component thereof with a volatile swelling agent in a pressure vessel for a period of time sufficient for said agent to swell the biomass or solid component thereof;
    rapidly reducing the pressure of the biomass or solid form component to explode the biomass or solid component thereof and recovering an exploded biomass or solid component thereof; and
    contacting the exploded biomass or solid component thereof with super-heated vapors of the swelling agent to vaporize and strip residual swelling agent from the exploded biomass, wherein the swelling agent vapors are contacted with the biomass at a first pressure sufficiently high such that the residual swelling agent can be condensed by ambient cooling media comprising air or water; and recovering the stripped biomass.

2. The method of claim 1 wherein said swelling agent comprises liquid ammonia, a primary amine, a secondary amine, liquid nitrogen dioxide, liquid sulfur dioxide, or mixtures thereof.

3. The method of claim 2 in which the swelling agent comprises liquid ammonia.

4. The method of claim 3 wherein the superheated ammonia vapors have a temperature from about 35° C. to about 200° C.

5. The method of claim 1 wherein said superheated swelling agent vapors are contacted with the biomass at a second pressure reduced sufficiently relative to said first pressure such that residual water is removed from the biomass.

6. The method of claim 1 wherein said biomass is contacted with said swelling agent in a pressure vessel at a pressure from about 11 atm (absolute) to about 35 atm (absolute).

7. The method of claim 6 wherein the pressure is from about 14 atm (absolute) to about 21 atm (absolute).

8. The method of claim 1 wherein said biomass is contacted with said swelling agent for about 3 to about 30 minutes.

9. The method of claim 1 wherein the pressure is rapidly reduced in less than about 10 seconds.

10. The method of claim 1 wherein said pressure is rapidly reduced in less than about 2 seconds.

11. The method of claim 1 which further comprises:

contacting the biomass or solid component with superheated steam prior to contact with said volatile swelling agent under conditions to:
(1) vaporize and separate water, if any, from the biomass or component; and
(2) produce a dried, preheated prehydrolyzed biomass or component and steam.

12. The method of claim 1 which further comprises:
contacting the exploded biomass or solid component thereof with a volatile swelling agent in a pressure vessel for a period of time sufficient to further swell the exploded biomass or solid component thereof; and
rapidly reducing the pressure of the biomass or solid form component to further explode the exploded biomass or solid component thereof and recovering a further exploded biomass or solid component thereof.

13. The method of claim 12 which further comprises reheating the exploded biomass prior to contacting the exploded biomass or solid component thereof with a volatile swelling agent in a pressure vessel for a period of time sufficient to further swell the exploded biomass or solid component thereof.

14. A method of refining biomass comprising:
contacting the biomass or solid component thereof with a volatile swelling agent in a pressure vessel at a superatmospheric pressure for a period of time sufficient for said agent to swell the biomass or solid component thereof;
contacting the swollen biomass or solid component with superheated vapors of the swelling agent at said superatmospheric pressure in a pressure vessel to vaporize and strip at least a portion of the swelling agent from the swollen biomass and separate the vapors therefrom;
rapidly reducing the pressure of the biomass or solid form component to explode the biomass or solid component thereof and recovering an exploded biomass or solid component thereof.

15. The method of claim 14 wherein said swelling agent comprises liquid ammonia.

16. A method for refining a biomass comprising the steps (a) contacting the biomass with a volatile swelling agent under pressure for a period of time sufficient to swell the biomass;
(b) rapidly reducing the pressure of the biomass in a manner sufficient to explode the biomass and recovering the exploded biomass containing residual swelling agent;
(c) contacting the exploded biomass with superheated vapors of the swelling agent at a first pressure to vaporize at least a portion of the residual swelling agent; and
(d) contacting the exploded biomass from step (a) with superheated vapors of the swelling agent at a second pressure which is lower than the pressure employed in step (c) to vaporize additional residual swelling agent.

17. The method of claim 16 wherein the exploded biomass recovered in step (b) is recycled to step (a) at least once to further explode and disrupt the biomass fiber.

18. The method of claim 17 wherein the exploded biomass is recycled twice to step (a).

19. A method for refining a biomass comprising:
(a) contacting the biomass with a volatile swelling agent at a first pressure for a period of time sufficient to swell the biomass and to produce a swollen biomass;
(b) recovering the swollen biomass produced in step (a);
(c) contacting the swollen biomass recovered in step (b) with superheated vapors of the swelling agent at said first pressure to vaporize at least a portion of the swelling agent from the swollen biomass;
(d) rapidly reducing said first pressure in a manner sufficient to explode the swollen biomass and to produce an exploded biomass containing residual swelling agent; and optionally
(e) contacting the exploded biomass with superheated vapors of the swelling agent at a second lower pressure to vaporize the residual swelling agent from the exploded biomass.

20. The method of claim 19 wherein the exploded biomass recovered in step (b) is recycled to step (a) a plurality of times to further explode and disrupt the biomass fiber.

21. The method of claim 20 wherein the exploded biomass is recycled twice to step (a).

* * * * *